United States Patent [19]

Saito et al.

[11] Patent Number: 4,539,486
[45] Date of Patent: Sep. 3, 1985

[54] SINGLE-CORE INDUCTOR GENERATOR FOR WELDING PRODUCING MULTIPLE, MUTUALLY-INDEPENDENT OUTPUTS

[75] Inventors: Yoshikazu Saito, Tokyo; Hiroshi Nakaya, Kawagoe, both of Japan

[73] Assignee: Denyo Kabushiki Kaisha, Tokyo, Japan

[21] Appl. No.: 508,147

[22] Filed: Jun. 27, 1983

[30] Foreign Application Priority Data

Feb. 8, 1983 [JP] Japan .................................. 58-19037

[51] Int. Cl.³ .............................................. B23K 9/10
[52] U.S. Cl. ..................................... 307/34; 219/134; 307/60; 307/84; 322/90; 322/97; 323/267
[58] Field of Search ........................ 307/33, 34, 60, 84; 322/90, 97; 363/67; 323/267, 268; 219/133, 134; 318/523, 530, 533

[56] References Cited

U.S. PATENT DOCUMENTS 3,858,108  12/1974  Bray .................................. 307/84 X
4,156,836   5/1979  Wiley ................................ 322/90 X
4,357,544  11/1982  May et al. ......................... 307/34

Primary Examiner—A. D. Pellinen
Assistant Examiner—Derek S. Jennings
Attorney, Agent, or Firm—Stevens, Davis, Miller & Mosher

[57] ABSTRACT

An inductor generator for welding in which: a plurality of generator elements are combined and incorporated in a single generator and respectively provided with excitation windings to render the generator elements self excitable; a constant-current control circuit is inserted between each excitation winding and corresponding field winding in order to stabilize the field current which has been once set. The constant-current control circuits are so mutually connected that compensation operation is possible so that, when the field current of any of the generator elements is varied, fluctuations of the output values of the other generator elements are prevented, these fluctuations otherwise being due to various effects acting mutually between the generator elements, particularly magnetic effect, in spite of the fact that the field currents of the other generator elements are being maintained at their set values. As a result the above described problems of the prior art are overcome.

2 Claims, 6 Drawing Figures

PRIOR ART FIG. 1

SINGLE-CORE INDUCTOR GENERATOR FOR WELDING PRODUCING MULTIPLE, MUTUALLY-INDEPENDENT OUTPUTS

BACKGROUND OF THE INVENTION

This invention relates to inductor generators for welding in each of which a plurality of electrogenerator elements are formed within a single generator so that a plurality of welders can simultaneously carry out welding work. More particularly, the invention relates to an inductor generator for welding of the above stated character in which, when respectively different outputs are being derived from the generator elements, inadvertent fluctuations of the previously set output values arising from magnetic influence mutually between the generator elements are effectively prevented.

Heretofore, in the case where a plurality of workers were to carry out welding work simultaneously at an outdoor work site, it has been the common practice to use engine-driven welding machines or units of the same number as the workers. By this practice, however, since these welding units are operated simultaneously, they produce much noise, vibration, and exhaust gas and, in many cases have been a source of public nuisance.

On the other hand, for the same purpose, generator power units of the type in which a plurality of generators are coaxially coupled to a single engine, those of the type in which a plurality of generators are driven by a single engine by belt drive, and other like systems have recently been proposed. However, the dimension in the engine axial direction in the former type and that in the width direction in the second type become enormous, and the entire machine becomes large, whereby not only are the portability and mobility greatly impaired for outdoor work, but, if the plurality of generators are to be accommodated in one and the same housing structure, the construction will become complicated, and repairs and maintenance will become troublesome.

Accordingly, one possible arrangement of an inductor generator system is that wherein, in a single generator: a plurality of generator elements are combined, each generator element having a field winding and an armature winding and further being provided with an excitation winding for self-excitation, the electromotive force of each excitation winding being applied by way of a rectifier and a variable resistor to the field winding, and the output of each armature winding is applied via a rectifier across a welding rod and the corresponding base or parent metal.

However, the generator elements have a variety of mutual effects and particularly impart magnetic influences on each other. For this reason, when the output of any one of the generator elements is caused to vary, the field currents and, further, the outputs of the armature windings of the other generator elements fluctuate in spite of the constant values of their respective variable resistors. This has been a problem in the prior art.

Accordingly, an inductor generator system in which, as disclosed in the specification of Japanese Utility Model Application No. 179260/1977, as a separate excitation type: a single yoke is so formed that its width is made narrow in the radial direction at positions spaced at n equal intervals so as to cause the magnetic reluctance to become substantially infinite; the field windings and the armature windings are wound around the parts of the yoke spaced at n equal intervals, the imparting of magnetic effect mutually between the field windings and armature windings being prevented by the existence of parts of narrow width of the yoke; and an inductor having salient poles is rotated thereby to lead out electrically independent outputs from the armature windings has been proposed.

In a generator system of this character, however, since a cylindrical stator iron core, that is, the yoke, has parts of narrow width in the diameter direction, the mechanical strength is low, and a great electromagnetic force arising from vibration of the engine or short circuiting at the time of welding acts on the yoke part. As a consequence, there have been various problems such as the necessity of resorting to a measure to prevent deformation.

SUMMARY OF THE INVENTION

It is an object of this invention to provide a generator for welding which is capable of supplying current outputs which can be varied in a mutually independent manner with respect to a plurality of welding workers.

According to this invention, there is provided an inductor generator for welding in which: a plurality of generator elements are combined and incorporated in a single generator and respectively provided with excitation windings to render the generator elements self excitable; a constant-current control circuit is inserted between each excitation winding and corresponding field winding in order to stabilize the field current which has been once set; and the constant-current control circuits are so mutually connected that compensation operation is possible so that, when the field current of any of the generator elements is varied, fluctuations of the output values of the other generator elements are prevented, these fluctuations otherwise being due to various effects acting mutually between the generator elements, particularly magnetic effect, in spite of the fact that the field currents of the other generator elements are being maintained at their set values, whereby the above described problems of the prior art are overcome.

The nature, utility, and further features of this invention will be more clearly apparent and understood from the following detailed description when read in conjunction with the accompanying drawings, briefly described below.

DETAILED DESCRIPTION OF THE INVENTION

Figure 1:
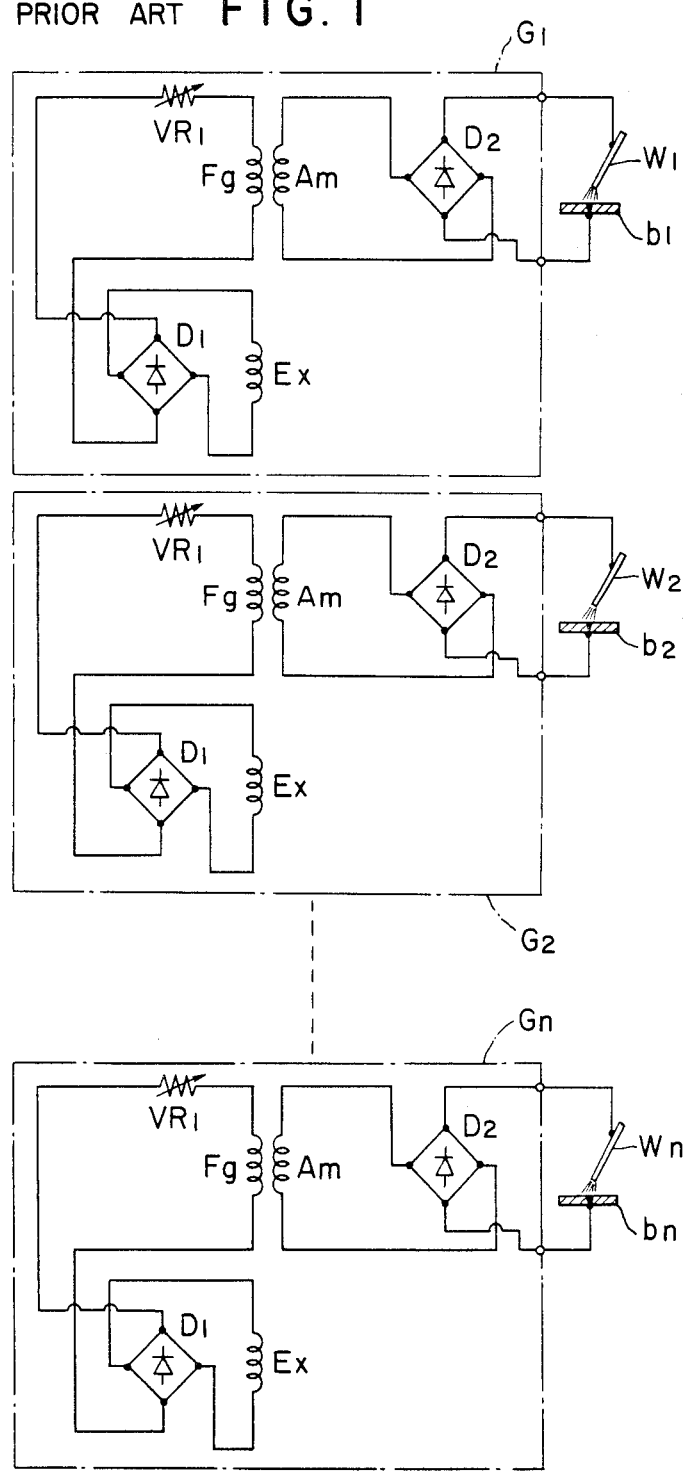
FIG. 1 is a circuit diagram of an inductor generator for welding known in the prior art.

As conducive to a full understanding of this invention and for comparison, the aforementioned inductor generator known in the prior art will first be considered briefly with reference to FIG. 1. This inductor generator comprises, in combination within a single generator, a plurality (n) of generator elements $G_1$, $G_2$, ... $G_n$. Each generator element G has a field winding Fg and an armature winding Am and is further provided with an excitation winding Ex for self excitation. In each generator element G, the electromotive force of the excitation winding Ex is applied through a rectifier $D_1$ and a variable resistor $VR_1$ to the field winding Fg, while the output of the armature winding Am is applied by way of a rectifier $D_2$ across a welding rod W ($W_1$, $W_2$, ... $W_n$) and the corresponding base or parent metal b ($b_1$, $b_2$, ... $b_n$)

However, as mentioned hereinbefore, the generator elements $G_1$, $G_2$, ... $G_n$ influence each other in various ways, particularly magnetically, whereby a variation in the output of any one of these generator elements gives rise to fluctuations in the field currents and outputs of the armature windings of the other generator elements in spite of the fact that their variable resistors are set at constant resistance values.

The inductor generator for welding according to this invention overcomes this problem and other problems encountered in the prior art as described hereinbefore.

Figure 2:
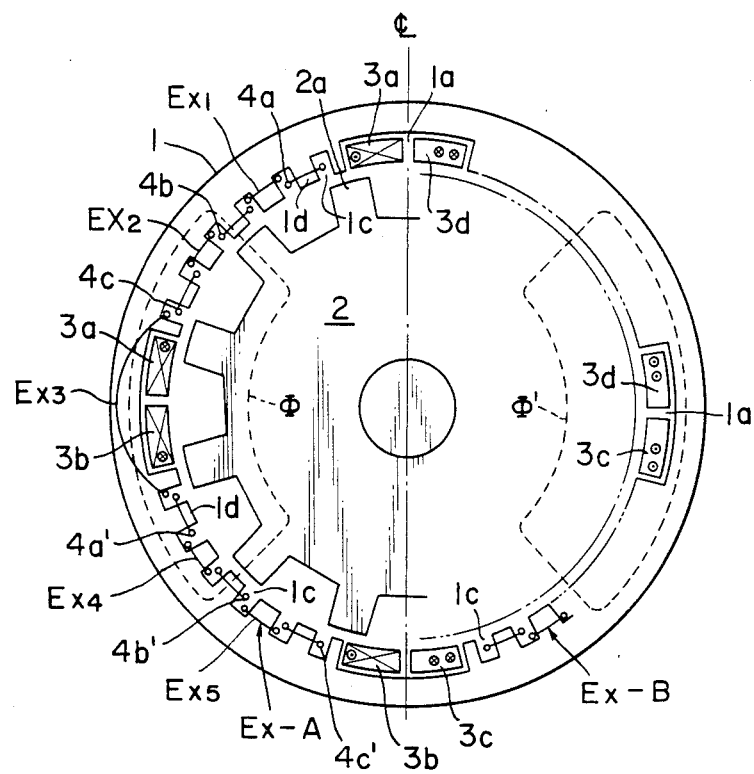
FIG. 2 is a cross sectional view, with some parts cut away, showing the internal construction of one example of an inductor generator for welding constituting an embodiment of this invention.

In a preferred embodiment of this invention as shown in FIG. 2, the inductor generator has a stator core 1 having around its inner surface four slots 1a for field windings at positions spaced at equal intervals, slots 1c for excitation windings and armature windings spaced at substantially equal intervals between the slots 1a for field windings, and stator teeth 1d for passing magnetic flux formed between adjacent slots 1c.

A rotor 2 is rotatably supported in coaxial relation to the stator core 1 and around its outer periphery has inductor salient poles 2a. Field windings 3a through 3d are wound in the slots for field windings 1a in a manner by which the forming of four poles is possible. Excitation windings $Ex_1$ through $Ex_5$ are wound in specific slots for excitation and armature windings 1c on the left side of the centerline and, moreover, are so connected as to constitute one group of these excitation windings. In specific slots for excitation and armature windings 1c on the right side of the centerline , excitation windings connected to form one group are wound similarly as described above.

Figure 3:
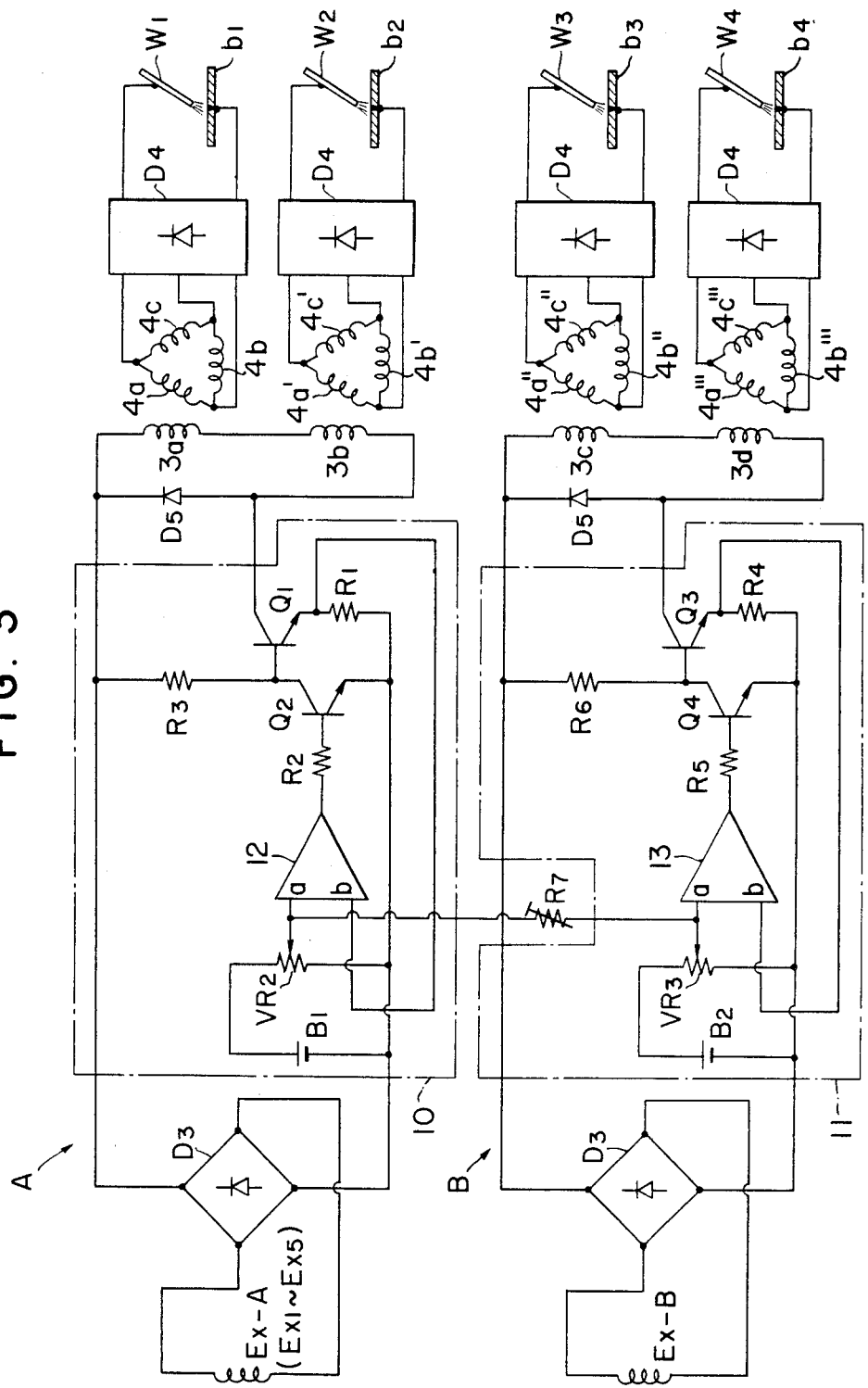
FIG. 3 is a circuit diagram of the inductor generator for welding shown in FIG. 2.

On the other hand, the field windings 3a and 3b are connected in series and are further connected to be supplied with field current by the above mentioned one group of excitation windings $Ex_1$ through $Ex_5$, that is, by the excitation winding Ex-A shown in FIG. 3, while the field windings 3c and 3d are similarly connected in series and are further connected to be supplied with field current by the other group of excitation windings Ex-B.

Furthermore, armature windings 4a, 4b, and 4c, 4a', 4b', and 4c', ... are wound in the aforementioned slots 1c for excitation windings and armature windings. These armature windings are so connected that those wound in each of the intervals between the slots 1a for field windings constitute one group. That is, four independent outputs can be led out. These armature windings 4a, 4b, and 4c, 4a', 4b', and 4c', ... of respective groups are of three-phase delta connection, and those thus connected are so connected as to supply welding output by way of three-phase full-wave rectifiers $D_4$ to welding rods $W_1$ through $W_4$ and base metals $b_1$ through $b_4$ as indicated in FIG. 3. Alternatively, these armature windings can also be of single-phase connection.

As shown in FIG. 3, excitation windings Ex-A and Ex-B of the groups are respectively connected to rectifiers $D_3$, $D_3$, the output ends of which are respectively connected by way of constant-current control circuits 10 and 11 to the field windings 3a through 3d. To the field windings 3a and 3b and the field windings 3c and 3d, flywheel diodes $D_5$ are respectively connected. In the constant-current control circuits 10 and 11, respectively, detecting resistors $R_1$ and $R_4$ for detecting field current are connected to the emitters of transistors for driving $Q_1$ and $Q_3$. The values of the terminal voltages of the detecting resistors $R_1$ and $R_4$ and the values of voltage drop of variable resistors $VR_2$ and $VR_3$ for setting due to constant-current sources $B_1$ and $B_2$ are compared by comparator circuits 12 and 13. On the basis of the resulting comparison values, the operations of the transistors $Q_1$ and $Q_3$ for driving are respectively controlled through resistors $R_2$ and $R_5$ for current limitation and transistors $Q_2$ and $Q_4$ for controlling. The aforedescribed field windings 3a, 3b and 3c, 3d are respectively inserted between the collectors of the transistors $Q_1$ and $Q_3$ for driving and the anodes of the diodes $D_3$, $D_3$.

Furthermore, between the slide terminals of the above mentioned variable resistors $VR_2$ and $VR_3$ for setting, that is, between the terminals a of the comparator circuits 12 and 13, a semifixed resistor $R_7$ for compensation ratio setting is inserted and mutually connected. The constant-current control circuits 10 and 11 are further provided with output resistors $R_3$ and $R_6$.

When the rotor 2 shown in FIG. 2 is rotated, electromotive forces are generated respectively in the excitation windings Ex-A and Ex-B shown in FIG. 3 and, after being rectified by the rectifiers $D_3$, $D_3$, are supplied through the constant-current control circuits 10 and 11 to the field windings 3a through 3d. The resulting field current produces a magnetic path $\Phi$ as shown in FIG. 2, while a magnetic path $\Phi'$ corresponding to the field windings 3c and 3d is similarly produced. Variations in the permeances of these magnetic paths are caused by the inductor salient poles 2a when the rotor 2 rotates and, of course, give rise to generation of electromotive forces in the excitation windings Ex-A and Ex-B.

The field currents flowing through the field windings 3a, 3b, 3c, and 3d are detected by the detecting resistors $R_1$ and $R_4$, and the values thus detected are fed into the comparator circuits 12 and 13, where they are compared with set values which have been set by the variable resistors $VR_2$ and $VR_3$ for setting. The set values can be varied at will by adjusting the variable resistors $VR_2$ and $VR_3$ for setting, and by this adjustable variation the outputs of the armature windings 3a through 3d, that is, the welding currents are adjusted.

The resulting comparison signals of the comparator circuits 12 and 13 are supplied respectively through the resistors $R_2$ and $R_5$ for current limitation to the bases of the transistors $Q_2$ and $Q_4$ for control, whereupon, on the basis of the comparison values, these transistors for control perform switching operations, which control the switching operations of the transistors $Q_1$ and $Q_2$ for driving. More specifically, the ON periods and the OFF periods of the switching are controlled, and the effective values of the field currents are automatically adjusted to the values set by the variable resistors $VR_2$ and $VR_3$ for setting. Accordingly, in the generator elements A and B shown in FIG. 3, adjustments can be carried out independently by their respective variable resistors $VR_2$ and $VR_3$ for setting to produce welding currents of mutually different values.

Figure 4:
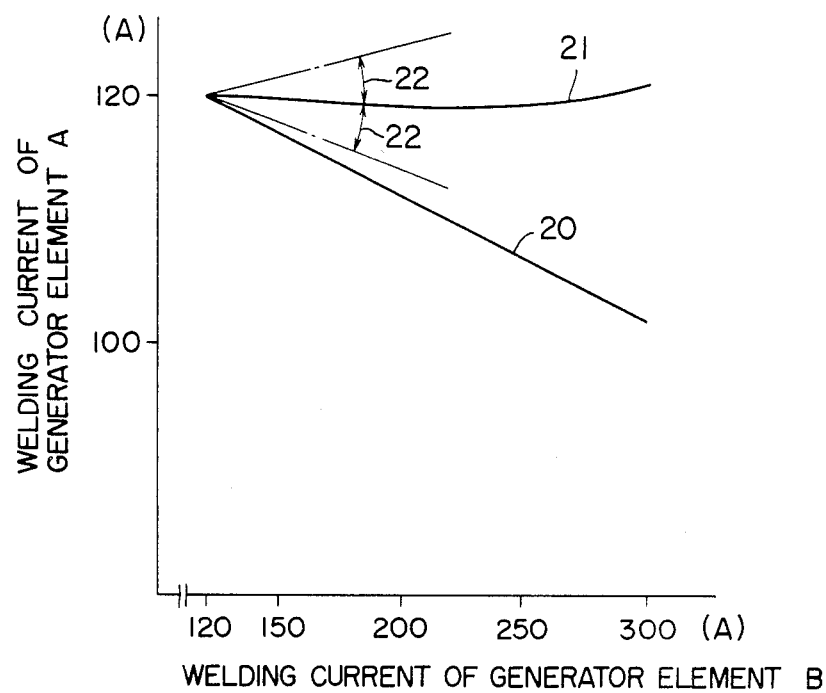
FIG. 4 is a graph indicating the relationship between the welding currents of generator elements B and A.

When, with the circuitry of FIG. 3 in a state wherein the semifixed resistor $R_7$ for compensation ratio setting has been removed, field windings of the separate excitation type are used for the field windings 3a, 3b and 3c, 3d particularly in order to obtain ideal, perfectly constant-current excitation, and the field current of the generator element B is varied to increase the welding current, the measured values of the welding current of the other generator element A become as indicated by curve 20 in FIG. 4. More specifically, when the welding current of the generator element B is increased from an initial state wherein the welding currents of the generator elements A and B are both set beforehand at 120 amperes, the welding current of the generator element A gradually decreases in spite of the fact that the field current of the generator element A is being held constant.

This phenomenon is of a nature such that, even with a circuit organization wherein only the semifixed resistor $R_7$ for compensation ratio setting has been removed thereby to cut the connection between the a terminals of the comparator circuits 12 and 13 in FIG. 3, not only does the phenomenon by which the welding current of the generator element A gradually decreases occur similarly, but it decreases further depending on the performances of the constant-current control circuits 10 and 11. In this circuit organization without the semifixed resistor $R_7$ for compensation ratio setting, the constant-current control circuits 10 and 11 so carry out their respective control operations that their respective field currents are maintained at values set independently by the variable resistors $VR_2$ and $VR_3$ for setting.

This unexpected drop in the output of the generator element A as described above does not have a great effect on the arc generating state and other operational states, particularly the welding state at the time of welding with a high output since the rate of decrease of the output relative to the desired set output value is low. However, during welding with a low current of the order of 100 amperes, the rate of decrease of the output relative to the desired set output is high, whereby there arises undesirably adverse effects on the arc generating state such as arc instability or arc breakage or interruption and, further, on the welding state.

The cause of the decrease in the welding current in one generator element A, in spite of the fact that its field current is being held constant, when the welding current of the other generator element B is varied as described above may be attributed principally to a magnetic effect imparted mutually between the generator elements A and B. As a result of this phenomenon, as described above, when the field current of one of the generator elements is adjusted to increase its welding current, the welding current of the other generator element, of course, decreases, but, when the welding current of one of the generator elements is reduced, the welding current of the other generator element conversely increases.

Figure 5:
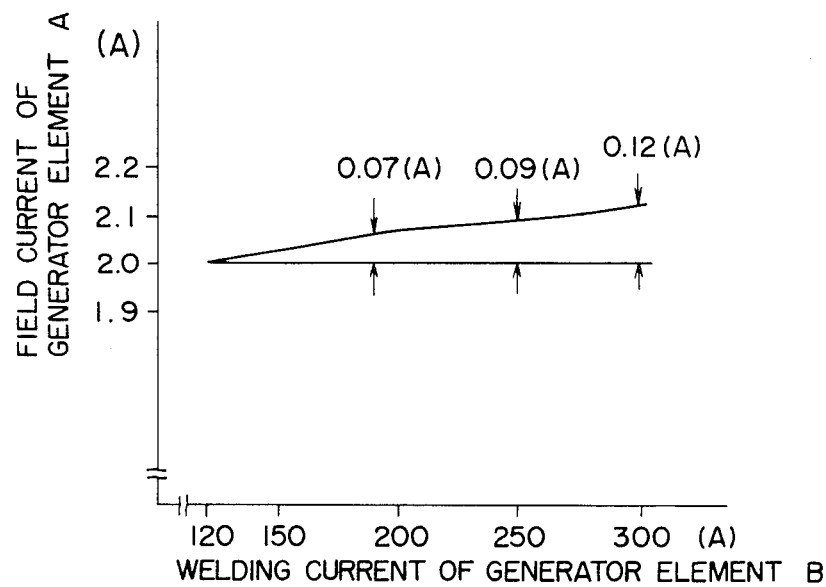
FIG. 5 is a graph indicating the relationship between the field current of the generator element A and the welding current of the generator element B.

Accordingly, in order to maintain the welding current of the generator element A constant when the welding current of the generator element B is increased by adjusting its field current, the field current of the element A is slightly increased in correspondence with the increase in the welding current of the element B as indicated in the following table and in FIG. 5.

| Generator element A | Welding current (A) | 120 | 120 | 120 | 120 |
|---|---|---|---|---|---|
| | Field current (A) | 2.00 | 2.07 | 2.09 | 2.12 |
| Generator element B | Welding current (A) | 120 | 190 | 250 | 300 |

On the other hand, in a circuit as shown in FIG. 3, in which the terminals a of the comparator circuits 12 and 13 are mutually connected by way of the semifixed resistor $R_7$ for compensation ratio setting, when the field current of one of the generator elements is varied, a compensation current flows via the semifixed resistor $R_7$ between the constant-current control circuits 10 and 11, and, in order to maintain constant the output, that is, the welding current, of the other generator element at a specific set value, a compensation operation is carried out between the comparator circuits 12 and 13.

Figure 6:
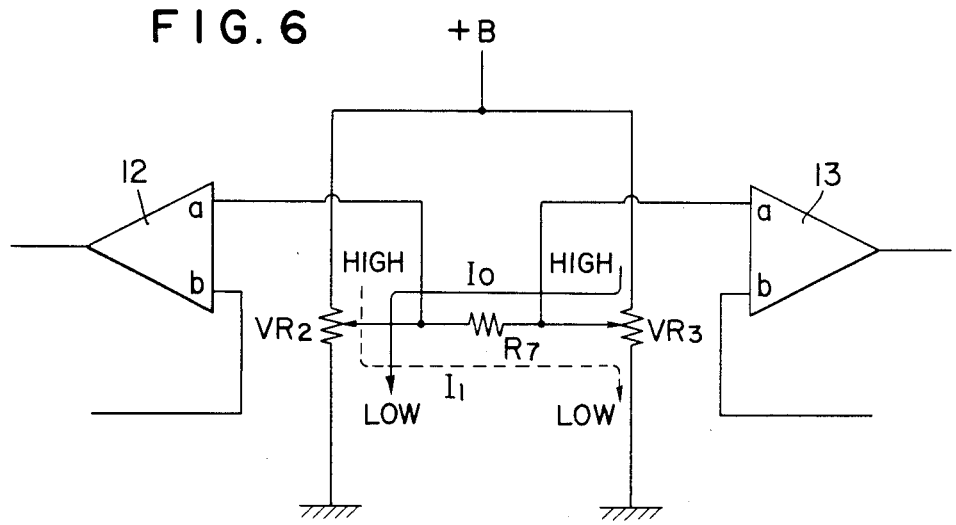
FIG. 6 is a circuit diagram of an essential part of the circuit shown in FIG. 3.

This operation will now be described with reference to FIG. 6. It will be assumed that, starting from the state wherein the welding currents of the generator elements A and B have been set at 120 amperes, the variable resistor $VR_3$ for setting on the side of the element B has been so adjusted as to increase the welding current to 190 amperes as in the above table. Then, the voltage on the slide terminal side of the variable resistor $VR_3$ is higher than the voltage on the slide terminal side of the variable resistor $VR_2$ for setting on the side of the element A. As a result, as indicated by full line in FIG. 6, a compensation current $I_0$ of a value for increasing the field current of the element A by 0.07 ampere so as to maintain the welding current of the element A at 120 amperes of the above table flows from the side of one variable resistor $VR_3$ for setting, via the semifixed resistor $R_7$ for compensation ratio setting, to the side of the other variable resistor $VR_2$.

As a consequence, the set value of the variable resistor $VR_2$ for setting is automatically corrected, in spite of the fact that its slide terminal has not undergone adjustment, so as to increase the field current of the generator element A from 2.00 amperes to 2.07 amperes. In response, the comparator circuit 12 operates to maintain the field current of the generator element A at the set value thus automatically corrected.

Then, when the welding current of the generator element B is increased up to 300 amperes, a compensation current $I_0$ of a value for increasing the field current of the generator element A by 0.12 ampere to the value indicated in the above table flows similarly as described above, whereby the welding current of the element A can be maintained at a constant value of 120 amperes. Thus, when the welding current of the element B is increased, the state of the welding current of the element A which has been compensation controlled by the compensation current $I_0$ as described above becomes as indicated by the broken line 21 in FIG. 4.

This curve 21 of FIG. 4 indicates the state actually measured with respect to the circuit organization shown in FIG. 3 and indicates that the output waveform of the inductor generator for welding is not a sinusoidal waveform but is closer to a triangular waveform. Moreover, while this curve has the unique characteristic of deforming greatly depending on the magnitude of the output, and while the welding current of the generator element A deviates somewhat from the set value of 120 amperes because of various conditions such as the state of the gaps between the inductor salient poles 2a and the stator teeth 1d, the curve 21 is maintained substantially constant.

The aforedescribed semifixed resistor $R_7$ for compensation ratio setting can be used to freely vary the value of the compensation current, and by this variation, the value of the welding current of the generator element A can be varied relative to the welding current of the element B as indicated by the arrow marked 22 in FIG. 4. This resistor $R_7$ is adjusted in accordance with various conditions such as the aforementioned unique characteristics of the single-core inductor generator for welding.

Conversely, when, from the state wherein the welding currents of the generator elements A and B are the same, the welding current of the element B is lowered, the voltage at the slide terminal of the variable resistor $VR_3$ for setting becomes lower than that of the slide terminal of the variable resistor $VR_2$. As a consequence, a compensation current $I_1$ flows from the variable resistor $VR_2$, through the semifixed resistor for compensation ratio setting, to the side of the variable resistor $VR_3$ as indicated by broken line in FIG. 6.

Accordingly, in spite of the fact that the slide terminal of the variable resistor $VR_2$ for setting is not being adjustably manipulated, the set value is automatically lowered by an increment corresponding to the quantity of adjustment of the other variable resistor $VR_3$ for setting. As a result, the field current of the generator element A is lowered so as to prevent a rise in the welding current of the element A accompanying the decrease in the welding current of the element B.

In the instant embodiment of this invention groups of excitation windings Ex-A and Ex-B are respectively provided on the left and right sides as shown in FIG. 2 and supply field currents respectively to field windings 3a and 3b and field windings 3c and 3d, whereby outputs are obtained respectively from the four groups of armature windings 4a, 4b, 4c; 4a', 4b', 4c'; . . . However, the number of windings and the number of groups of excitation windings Ex-A and Ex-B, field windings 3a through 3d, and armature windings 4a, 4b, 4c, 4a', 4b', 4c'; . . . are not limited to those in the example of the invention described above but may, of course, be selected at will. Furthermore, even in the case of a single-core inductor generator having three or more generator elements, the respective constant-current control circuits of these generator elements are mutually connnected, of course, by way of a semifixed resistor for compensation ratio setting or a transistor circuit or the like of equivalent function.

As described in the foregoing disclosure, in the inductor generator for welding according to this invention: a plurality of generator elements are provided in a single generator assembly; the outputs of the generator elements, that is, the welding currents thereof, can, of course, be varied singly and independently at will; and even when the field current of one generator element is increased or decreased to vary the output current of that generator element, a compensation current flows between the constant-current control circuits of the generator elements to correct the magnetic effect mutually acting between the generator elements thereby to maintain constant the other output currents, whereby the stability of the outputs of all generator elements is very high. Accordingly, problems encountered in the prior art, such as worsening of the welding arc state or defective welding such as arc interruption occurring particularly during welding with low power when an unexpected fluctuation occurs in a welding output, can be effectively solved. Moreover, there is no necessity of altering the construction of the stator core and other parts of the generator itself in order to prevent mutual magnetic effect between the generator elements.

What is claimed is:

1. In a single core inductor generator for welding which has a stator core divided into a plurality of field pole pairs respectively having field windings and excitation windings and is adapted to derive mutually independent outputs from armature windings wound respectively in said field pole pairs, the improvement wherein constant-current control circuits for detecting the current values of the fields and carrying out control to maintain said detected values at adjustably variable set values are respectively interposed between said field and excitation windings, each of said constant-current control circuits being provided with a respective comparator circuit which compares a value of the output signal of a respective constant-current control circuit with a respective set value, the constant-current control circuits being connected through a resistance element which is coupled to input terminals set valves are respectively applied so that, when the field current of one of said constant current control circuits to which said, field winding undergoes a variation, the field current of each of the other field windings is compensated and controlled to vary from the set value thereof by an increment corresponding to the magnitude of said variation of the field current of said one field winding.

2. A single-core inductor generator for welding according to claim 1 in which said resistance is of a semifixed type, the resistance value of which can be adjusted.

* * * * *